United States Patent
Qiu et al.

(10) Patent No.: US 9,154,449 B2
(45) Date of Patent: Oct. 6, 2015

(54) INTER-BOARD COMMUNICATION APPARATUS, METHOD FOR TRANSMITTING AND RECEIVING MESSAGE OF INTER-BOARD COMMUNICATION

(75) Inventors: Jing Qiu, Shenzhen (CN); Huaiyun Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 579 days.

(21) Appl. No.: 13/378,289

(22) PCT Filed: Oct. 27, 2009

(86) PCT No.: PCT/CN2009/074632
§ 371 (c)(1),
(2), (4) Date: Dec. 14, 2011

(87) PCT Pub. No.: WO2010/145113
PCT Pub. Date: Dec. 23, 2010

(65) Prior Publication Data
US 2012/0102149 A1    Apr. 26, 2012

(30) Foreign Application Priority Data
Jun. 18, 2009 (CN) .......................... 2009 1 0086699

(51) Int. Cl.
*G06F 15/16* (2006.01)
*H04L 12/931* (2013.01)
*H04L 29/08* (2006.01)

(52) U.S. Cl.
CPC .............. *H04L 49/355* (2013.01); *H04L 69/32* (2013.01)

(58) Field of Classification Search
CPC ............................... H04L 69/32; H04L 49/355
See application file for complete search history.

(56) References Cited

U.S. PATENT DOCUMENTS

| 5,905,719 A * | 5/1999 | Arnold et al. ................. 370/330 |
| 2005/0022143 A1* | 1/2005 | Butts et al. ........................ 716/5 |

(Continued)

FOREIGN PATENT DOCUMENTS

| CN | 1825804 A | 8/2006 |
| CN | 101043510 A | 9/2007 |

(Continued)

OTHER PUBLICATIONS

Charles M. Kozierok (2001-2005). "The TCP/IP Guide". Retrieved on Mar. 10, 2014 from <http://www.tcpipguide.com/free/t_DataLinkLayerLayer2.htm>.*

(Continued)

*Primary Examiner* — Brian J Gillis
*Assistant Examiner* — Juan C Turriate Gastulo
(74) *Attorney, Agent, or Firm* — IPLM Group, P.A.

(57) ABSTRACT

The present invention discloses an inter-board communication apparatus and a method for transmitting and receiving a message of inter-board communication. The apparatus includes: a message distribution layer module (110) configured to route an application message; a data link layer module (120) comprising a link protocol sub-layer module (122) able to be set selectively, the link protocol sub-layer module (122) providing an interface to mount to external concrete communication protocols; a physical layer module (130) configured to physically transmit the application message; a link information registration module (140) configured to register link attribute information, determine whether to set selectively the link protocol sub-layer module (122) in the data link layer module (120) based on the link attribute information, and determine the specific communication protocols mounted to the link protocol sub-layer module (122), which is configured to submit the application message to the specific communication protocols for processing when set selectively.

13 Claims, 7 Drawing Sheets

(56) References Cited

U.S. PATENT DOCUMENTS

2005/0160132 A1* 7/2005 Van Doren et al. ............ 709/200
2006/0274671 A1* 12/2006 Budampati et al. ........... 370/254
2006/0277298 A1* 12/2006 Kim et al. ..................... 709/224
2007/0207802 A1* 9/2007 Palmer et al. ................. 455/428

FOREIGN PATENT DOCUMENTS

| | | |
|---|---|---|
| EP | 1484897 A1 | 12/2004 |
| KR | 20030056097 A | 7/2003 |
| WO | 2008005680 A2 | 1/2008 |

OTHER PUBLICATIONS

International Search Report from corresponding PCT application PCT/CN2009/074632, mailed Mar. 11, 2010 (with English translation).

* cited by examiner

INTER-BOARD COMMUNICATION APPARATUS, METHOD FOR TRANSMITTING AND RECEIVING MESSAGE OF INTER-BOARD COMMUNICATION

TECHNICAL FIELD

The present invention mainly relates to the inter-board communication in distributed systems, and more particularly, to an inter-board communication apparatus and a method for transmitting and receiving a message of inter-board communication.

BACKGROUND OF THE RELATED ART

With the rapid development of computer technology, distributed system architecture has become a basic option for most large-scale automatic equipment (such as telecommunication equipment, industrial control equipment, etc.). Such distributed architecture generally consists of more than one autonomous computer subsystems/single boards. Different subsystems/boards are connected to each other via a communication channel. Meanwhile, a subsystem/single board itself may be a small-scale distributed subsystem consisting of a number of processors. The whole system is centrally controlled by a master subsystem/single board which is also a unique interface, by which a user manages the system. Each subsystem/single board is also managed by the master control unit/signal board.

A software system architecture typically used by such distributed system is a model based on a process. The process may be distributed in different processors and its location is not required to be paid attention. Messages are transferred between processes in different processors via inter-board communication. The application of such distributed processes needs the inter-board communication to solve the problem of how to send a message of one process to a specified process distributed in a different logical address, that is, how to route the message and how to reliably send the message in a specified link.

In the prior art, a commonly used method is to use the TCP/IP protocol stack to encapsulate messages by sockets for transmission. Advantages of this method are that versatility is strong, technology is mature, and standard protocol stack software provided by a third party can be used. Its disadvantages are that more codes are required to be introduced in the system, which is not suitable for environments where resource restriction is higher, and that the messages are required be encapsulated into IP packets so as not to mount to other custom communication protocols. Another method is to write custom inter-board communication protocols, and it has advantages of fewer codes and simple implementation. However, since there is no available criterion for the writing, this method has poor reusability and is not universal.

CONTENT OF THE INVENTION

The present invention provides an inter-board communication apparatus and a method for transmitting and receiving a message of inter-board communication so as to resolve the opacity of a message processing object to bottom link and the dependence of the message processing object on specific protocols, thereby increasing the flexibility of protocol transposition.

Implementation of the technical scheme of the present invention will be described below.

The present invention provides an inter-board communication apparatus comprising:

a message distribution layer module configured to determine whether an application message is processed locally or sent out, and if the application is determined to be sent out, route the application message to a data link layer module or a physical layer module according to link attribution information of the application message; and the data link layer module connected to the message distribution layer module and configured to perform link transmission of a received application message, wherein the data link layer module comprises a link protocol sub-layer module which can be selectively configured to:

provide an interface connecting the link protocol sub-layer module with threads of external communication protocols such that different threads of external communication protocols can be interfaced to the link protocol sub-layer module, and when the link protocol sub-layer module is configured, submit the received application message to a thread of a specific communication protocol corresponding to the received application message for processing;

the physical layer module connected to the data link layer module and configured to physically transmit the received application message; and a link information registration module configured to register link attribute information of application messages, and determine whether to configure the link layer protocol sub-layer module in the data link layer module based on registered link attribute information of an application message, and if yes, determine a thread of a specific communication protocol corresponding to the application message to be interfaced to the link protocol sub-layer module;

so as to support control of the inter-board communication.

Preferably, the data link layer modules further comprises a segmentation and recombination sub-layer module which can be selectively configured to:

segment a received application message into data frames with fixed length to send to the link protocol sub-layer module when the inter-board communication apparatus is used to send an application message, or recombine a received data frames with fixed length processed by a thread of a specific communication protocols into an application message when the inter-board communication apparatus is used to receive an application message;

the link protocol sub-layer module is further configured to receive the segmented data frames with fixed length when the inter-board communication apparatus is used to send an application message;

the link information registration module is further configured to determine whether to configure the segmentation and recombination sub-layer module in the data link layer module based on both of the link attribute information and the specific communication protocol of the application message.

Preferably, the data link layer module further comprises a frame delimitation sub-layer module which can be selectively configured to:

add a frame identifier to a received application message processed by a thread of a specific communication protocol to implement framing and send the framed application message to the physical layer module when the inter-board communication apparatus is used to send an application message, or acquire a complete application message based on the frame identifier to implement de-framing and send the de-framed application message to the link protocol sub-layer module when the inter-board communication apparatus is used to receive an application message;

the link information registration module is further configured to determine whether to configure the frame delimitation sub-layer module in the data link layer module based on both of the link attribute information and the specific communication protocol of the application message.

Preferably, the message distribution layer module determines whether the application message is processed locally or sent out based on a mapping relationship between a link address and an application message address of the received application message.

The present invention further provides a method for transmitting a message of inter-board communication comprising:

step A: a link information registration module registering link attribute information of application messages;

step B: the link information registration module determining whether to configure a link protocol sub-layer module in a data link layer module based on registered link attribute information of an application message, and if yes, further determining a thread of a specific communication protocol corresponding to the application message to be interfaced to the link protocol sub-layer module;

step C: a message distribution layer module routing an application message sent by an upper application, and determining whether the application message is processed locally or sent out; and if the application message is determined to be sent out, routing the application message to the data link module or a physical layer module according to link attribute information of the application message;

step D: the link protocol sub-layer module receiving and submitting a received application message to the thread of the specific communication protocol corresponding to the received application message which is interfaced to the link protocol sub-layer module for processing, the processed application message being sent to a physical layer module, if the application message is determined not to be transmitted via the data link layer module, the application message is directly sent to the physical layer module by the message distribution layer module without through the data link layer module; and step E: the physical layer module physically transmitting the received application message.

Preferably, the step A further comprises: the link information registration module determining whether to configure a segmentation and recombination sub-layer module in the data link layer module based on both of the link attribute information and the specific communication protocol of the application message;

if the segmentation and recombination sub-layer module is configured in the data link layer module, before the link protocol sub-layer module receives the application message, the step D further comprises:

the segmentation and recombination sub-layer module segmenting the application message sent by the message distribution layer module into data frames with fixed length to send to the link protocol sub-layer module.

Preferably, the step B further comprises: the link information registration module determining whether to configure a frame delimitation sub-layer module in the data link layer module based on both of the link attribute information and the specific communication protocol of the application message;

if the frame delimitation sub-layer module is configured in the data link layer module, after the application message is processed by the thread of the specific communication protocols, the step D further comprises:

the frame delimitation sub-layer module receiving the application message processed by the thread of the specific communication protocols, and adding a frame identifier to the application message to implement framing and send the framed application message to the physical layer module.

The present invention further provides a method for receiving a message of inter-board communication comprising:

step A: a link information registration module registering link attribute information of the application messages;

step B: the link information registration module determining whether to configure a link protocol sub-layer module in a data link layer module based on registered link attribute information of an application message, and if yes, determining a thread of a specific communication protocol corresponding to the application message to be interfaced to the link protocol sub-layer module;

step C: a physical layer module receiving an application message physically transmitted and determining whether the received application message to be transmitted via the data link layer module;

step D: the link protocol sub-layer module receiving and submitting a transmitted application message to the thread of the specific communication protocol corresponding to the transmitted application message which is interfaced to the link protocol sub-layer module for processing, and sending the processed application message to a message distribution layer module, if the received application message is determined not to be transmitted via the data link layer module, the received application message is sent directly by the physical layer module to the message distribution layer module without through the data link layer module; and step E: the message distribution layer module routing the received application message to determine whether the application message is processed locally or sent out.

Preferably, the step B further comprises: the link information registration module determining whether to configure a frame delimitation sub-layer module in the data link layer module based on both of the link attribute information and the specific communication protocol of the application message;

If the frame delimitation sub-layer module is configured in the data link layer module, before the link protocol sub-layer module receives the transmitted application message, the step C further comprises:

the frame delimitation sub-layer module acquiring a complete application message based on a frame identifier of the transmitted application message to implement de-framing and send the de-framed application message to the link protocol sub-layer module.

preferably, the step B further comprises: the link information registration module determining whether to configure a segmentation and recombination sub-layer module in the data link layer module based on both of the link attribute information and the specific communication protocol of the application message;

If the segmentation and recombination sub-layer module is configured in the data link layer module, after the application message is processed by the thread of the specific communication protocol corresponding to the application message, the step D further comprises:

the segmentation and recombination sub-layer module receiving data frames with fixed length processed by the thread of the specific communication protocols to recombine into an application message and send the recombined application message to the message distribution layer module.

The present invention uses a hierarchical design to seamlessly mount a variety of specific communication protocols into a communication hierarchical structure (an interface of a link protocol sub-layer module) by summarizing characteristics of the existing communication protocols so as to resolve the opacity of a message processing object to bottom link and the dependence of the message processing object on the specific protocols, thereby increasing the flexibility of protocol transposition and greatly reducing workload of the protocol transposition, thus it is very suitable for distributed system environments in which multiple message transmission protocols coexist.

BRIEF DESCRIPTION OF DRAWINGS

In order to illustrate the technical scheme of the present invention more clearly, the accompanying figures presented in embodiments or the prior art will be described briefly hereinafter. It is evident that the accompanying figures in the following description are only some embodiments of the present invention, and that based on these accompanying figures, those skilled in the art can obtain other accompanying figures without creative work.

PREFERRED EMBODIMENTS OF THE PRESENT INVENTION

The technical scheme of the present invention will be described clearly and completely in conjunction with the accompanying figures in embodiments of the present invention. Obviously, the embodiments described herein are only some embodiments not all embodiments of the present invention. Based on the embodiments of the present invention, all other embodiments implemented by those skilled in the art without any creative work belong to the scope protected by the present invention.

Figure 1:
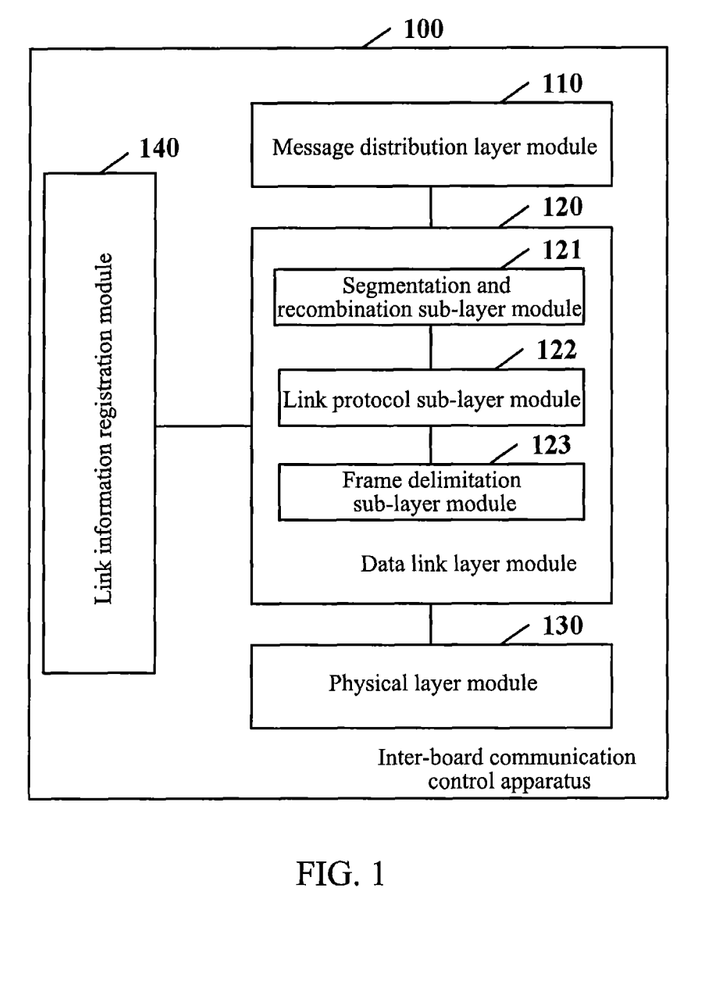
FIG. 1 is a block diagram of the first embodiment of an inter-board communication apparatus in accordance with the present invention.

Referring to FIG. 1, a block diagram of the first embodiment of an inter-board communication apparatus (which may also be known as an inter-board communication control apparatus) is shown.

The inter-board communication control apparatus 100 comprises a three-layer structure composed of a message distribution layer module 110, a data link layer module 120 and a physical layer module 130. The inter-board communication control apparatus 100 further comprises a link information registration module 140, and the data link layer module 120 comprises a link protocol sub-layer module 122 able to be set selectively, a segmentation and recombination sub-layer module 121 able to be set selectively, and a frame delimitation sub-layer module 123 able to be set selectively.

The message distribution layer module 110 is configured to route an application message and determine whether the application message is processed locally or sent out.

The message distribution layer module 110 receives an application message sent by an upper application or an application layer message sent by a data link layer, and if the application message is transmitted physically directly (reliable transmission without protocol guarantee data), the application message can be sent to the message distribution layer module 110 directly by the physical layer module 130.

The message distribution layer module 110 may determine whether the application message to be processed is processed locally or sent out based on a mapping relationship between an application message address and a link address. If the application message is a message of a local processor, it is forwarded to a local specific message processing object via a forwarding interface; if the application message is not a message of the local processor, it is re-routed and sent to the data link layer module 120 by calling an interface of the data link layer module 120, or directly sent to the physical layer module 130 (if the application message is physically transmitted directly).

The data link layer module 120 is connected to the message distribution layer module 110 and the physical layer module 130, and is configured to perform of link transmission of the received application message. The data link layer module 120 may transfer the application message sent by the message distribution layer module 110 to the physical layer module 130, or may transfer the application message sent by the physical layer module 130 to the message distribution layer module 110.

The link protocol sub-layer module 122 provides an interface mounted to specific external communication protocols such that different specific external communication protocols (including standard communication protocols and custom communication protocols) are mounted to the link protocol sub-layer module 122, which is configured to submit the application message to the specific communication protocols for processing when set selectively. The present invention uses the interface of the link protocol sub-layer module 122 to mount various specific communication protocols, increasing the flexibility of protocol transposition and greatly reducing workload of the protocol transposition, thus it is very suitable for distributed system environments in which multiple message transmission protocols coexist.

The link protocol sub-layer module 122 may receive the application message sent by the message distribution layer, or receive the application message sent by the segmentation and recombination sub-layer module 121 (when the segmentation and recombination sub-layer module 121 is set selectively in the data link layer module 120), and process and send the received application message to the frame delimitation sub-layer module 123 (when the frame delimitation sub-layer module 123 is set selectively in the data link layer module 120 or the physical layer module 130, and vice versa, that is, the link protocol sub-layer module 122 may receive the application message sent by the physical layer module 130, or receive the application message sent by the frame delimitation sub-layer module 123 (when the frame delimitation sub-layer module 123 is set selectively in the data link layer module 120), and process and send the received application message to the segmentation and recombination sub-layer module 121 (when the segmentation and recombination sub-layer module 121 is set selectively in the data link layer module 120) or the message distribution layer module 110.

When sending the application message, the link protocol sub-layer module 122 sends a notification message to a process in which the specific mounted communication protocols are located. The specific communication protocols process and then send the application message to directly the physical layer for transmission, and return the application message to the link protocol sub-layer module 122. The link protocol sub-layer module 122 then sends the application message to the frame delimitation sub-layer module 123 (when the frame delimitation sub-layer module 123 is set selectively in the data link layer module 120) or the physical layer module 130. In contrast with the process occurring when the application message is received, the link protocol sub-layer module 122 sends a notification message to a process in which the specific mounted communication protocols are located, and the specific communication protocols process and then send the application message directly to the message distribution layer module 110 for transmission, and return the application message to the link protocol sub-layer module 122. The link protocol sub-layer module 122 then sends the application message to the segmentation and recombination sub-layer module 121 (when the segmentation and recombination sub-layer module 121 is set selectively in the data link layer module 120) or the message distribution layer module 110.

The segmentation and recombination sub-layer module 121 is configured to segment the received application message into data frames with fixed length when set selectively in the data link layer module 120, or recombine the received data frames with fixed length into an application message.

The application message may have variable length, while the specific communication protocols have requirements for data length for each transmission. Therefore, the application message should be segmented into data frames with fixed length upon transmission, and the data frames with fixed length are recombined into the application message upon reception. The segmentation and recombination sub-layer module 121 implements segmentation and frame combination as well as reverse recombination and frame splitting of the application message.

The frame delimitation sub-layer module 123, when set selectively, is configured to add a frame identifier to the received application message to implement framing, or acquire a complete application message based on the frame identifier to implement de-framing. In the case where the physical layer module 130 does not transmit or receive the whole frame information for one time (e.g., transmission and reception of serial ports take a single byte as a unit), the frame delimitation sub-layer module 123 is required to set selectively in the data link layer module 120, and a frame identifier is added to a data frame upon the transmission to implement framing; the whole data frame is acquired based on the frame ID upon the reception to implement de-framing.

The link information registration module 140 is configured to register link attribute information and determine whether to set selectively the link protocol sub-layer module 122 in the data link layer module 120 based on the link attribute information, and determine specific communication protocols mounted to the link protocol sub-layer modules 122; determine whether to set selectively the segmentation and recombination sub-layer module 121 in the data link layer module 120 based on the link attribute information and the specific communication protocols; and determine whether to set selectively the frame delimitation sub-layer module 123 in the data link layer module 120 based on the link attribute information and the specific communication protocols.

A specific transmission process of the application message in the inter-board communication control apparatus 100 as well as the selective setting and operation principle of the link protocol sub-layer module 122, the segmentation and recombination sub-layer module 121, and the frame delimitation sub-layer module 123 in the data link layer module 120 will be described in detail hereinafter in the section of the embodiments of the method.

In one preferred embodiment of the present invention, when the segmentation and recombination sub-layer module 121, the link protocol sub-layer module 122, and the frame delimitation sub-layer module 123 are set selectively in the data link layer module 120, the transmitting process when an application message is sent will be described now. The message distribution layer module 110 sends the application message to the segmentation and recombination sub-layer module 121 in the data link layer module 120, the segmentation and recombination sub-layer module 121 processes and then transmits the application message to the link protocol sub-layer module 122, the link protocol sub-layer module 122 processes and then transmits the application message to the frame delimitation sub-layer module 123, the frame delimitation sub-layer module 123 processes and transmits the application message to the physical layer module 130, and when one or more of the three sub-layer modules in the data link layer module 120 are not set selectively, the application message is sent directly to the next module without through the sub-layer module. The process of receiving the application message is contrary to the process of transmitting the application message.

The present invention uses a hierarchical design to seamlessly mount a variety of specific communication protocols into a communication hierarchical structure (an interface of a link protocol sub-layer module) by summarizing characteristics of the existing communication protocols so as to resolve the opacity of a message processing object to bottom link and the dependence of the message processing object on the specific protocols, thereby increasing the flexibility of protocol transposition and greatly reducing workload of the protocol transposition, thus it is very suitable for distributed system environments in which multiple message transmission protocols coexist.

Figure 2:
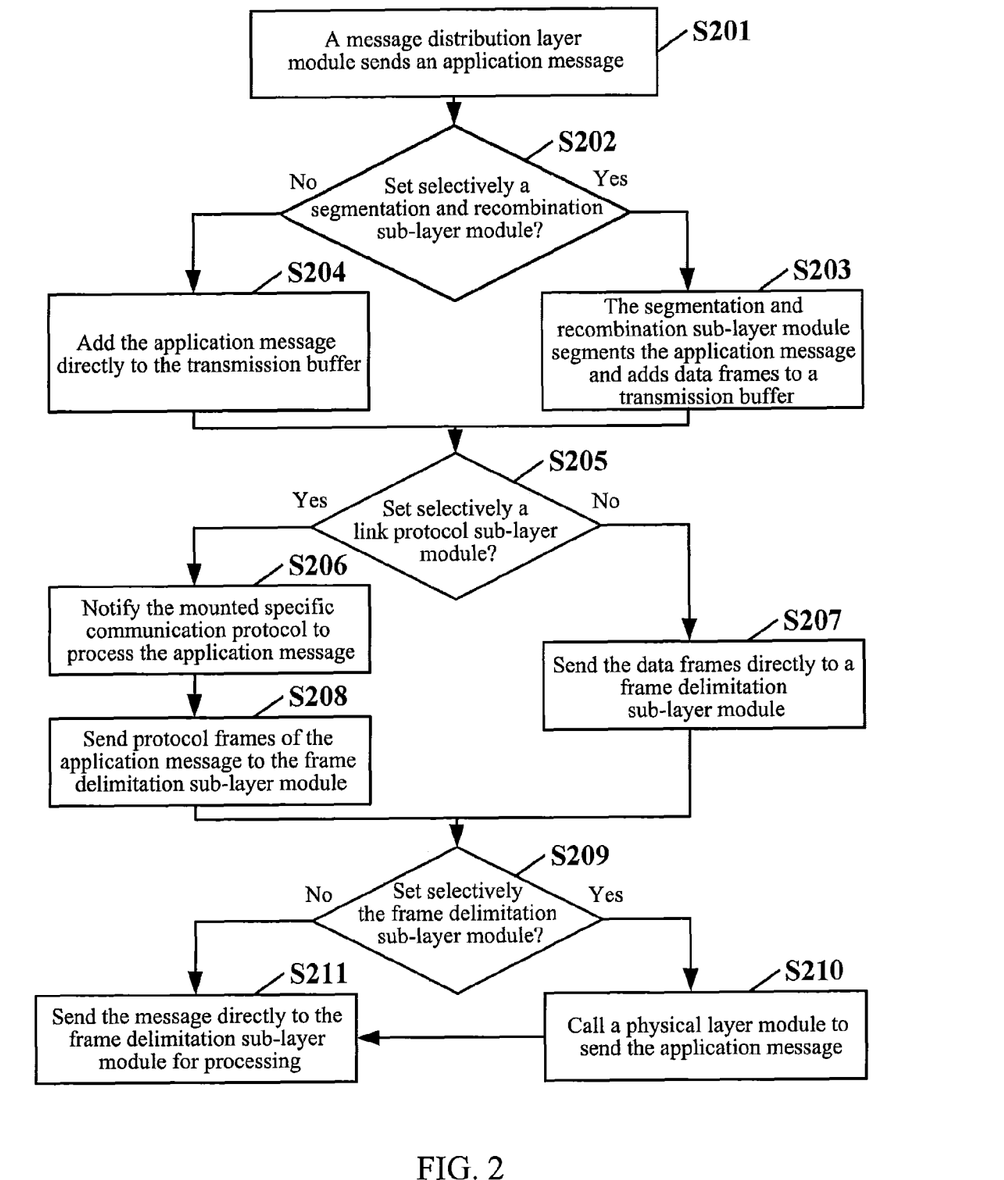
FIG. 2 is a flow chart of the first embodiment of a method for transmitting a message of inter-board communication in accordance with the present invention.

Referring to FIG. 2, a flow chart of the first embodiment of a method for transmitting a message of inter-board communication in accordance with the present invention is shown. The method comprises the following steps.

Step S201, a message distribution layer module sends an application message.

Step S202, a link information registration module determines whether to set selectively a segmentation and recombination sub-layer module in a data link layer module, and the process proceeds to step S203 if yes, otherwise, it proceeds to step S204.

Step S203, the segmentation and recombination sub-layer module segments the application message and adds the segmented data frames to a transmission buffer, and the process proceeds to step S205.

Step S204, the application message is added directly to the transmission buffer, and the process proceeds to step S205.

Step S205, the link information registration module determines whether to set selectively a link protocol sub-layer module in the data link layer module, and the process proceeds to step S206 if yes, otherwise, it proceeds to step S207.

Step S206, the link protocol sub-layer module notifies the mounted specific communication protocols to process the application message, and the process proceeds to step S208.

Step S207, the data frames of the application message is sent directly to a frame delimitation sub-layer module, and the process proceeds to step S209.

Step S208, the specific communication protocols process the application message internally and transmit protocol frames of the application message to a frame delimitation sub-layer module, and the process proceeds to step S209.

Step S209, the link information registration module is determined whether to set selectively the frame delimitation sub-layer module in the data link layer module, and the process proceeds to step S210 if yes, otherwise, it proceeds to step S211.

Step S210, the frame delimitation sub-layer module adds a frame identifier to the application message to implement framing, and the process proceeds to step S211.

Step S211, a physical layer module is called to send the application message.

Figure 3:
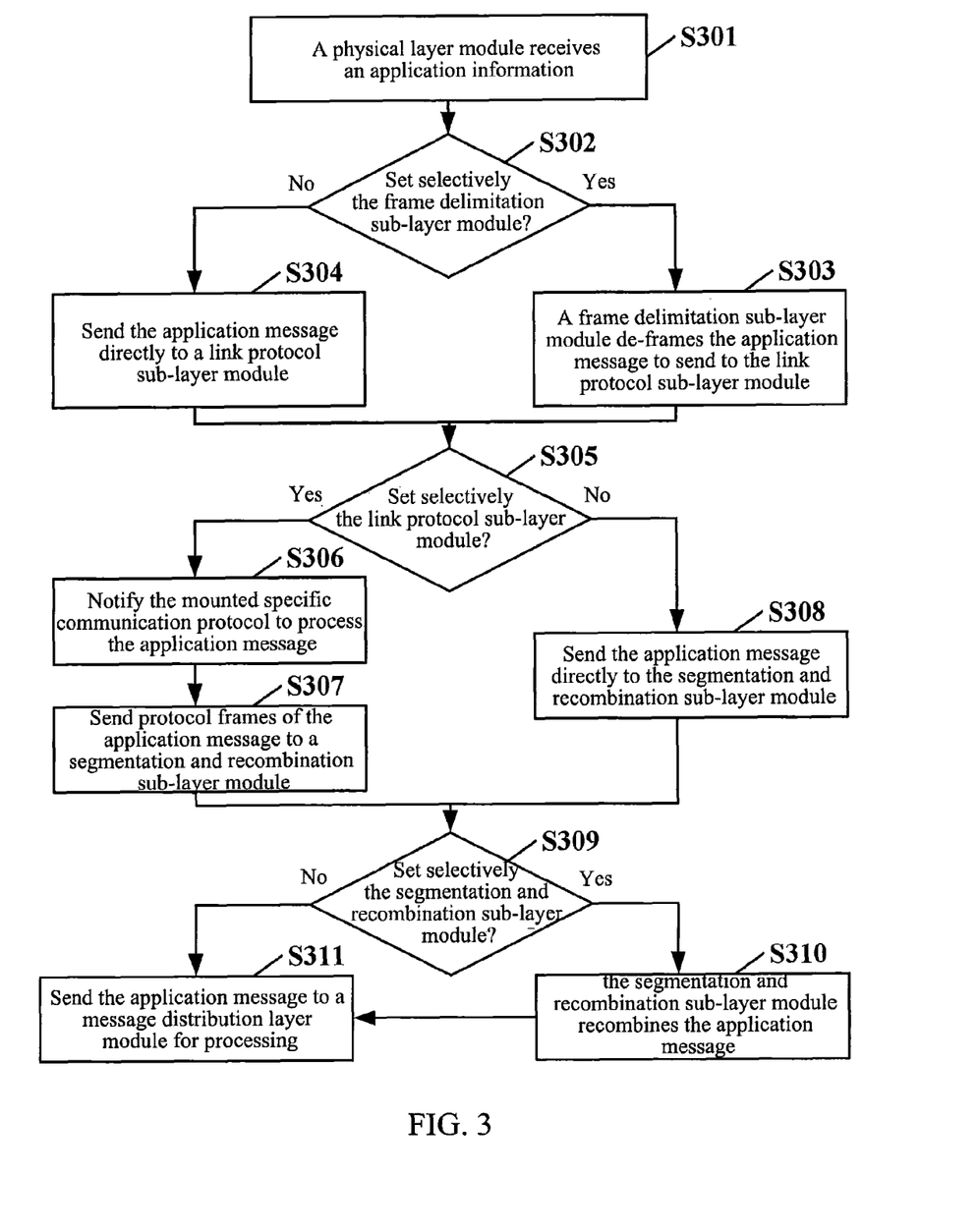
FIG. 3 is a flow chart of the first embodiment of a method for receiving a message of inter-board communication in accordance with the present invention.

Referring to FIG. 3, a flow chart of the first embodiment of a method for receiving a message of inter-board communication in accordance with the present invention is shown. The method comprises the following steps.

Step S301, a physical layer module receives an application information, and the process proceeds to step S302.

Step S302, a link information registration module determines whether to whether to set selectively a frame delimitation sub-layer module in a data link layer module, and the process proceeds to step S303 if yes, otherwise, it proceeds to step S304.

Step S303, the frame delimitation sub-layer module de-framing the application message sent by the physical layer to transmit to a link protocol sub-layer module, and the process proceeds to step S305.

Step S304, the application message received by the physical layer module is sent directly to a link protocol sub-layer module, and the process proceeds to step S305.

Step S305, it is determined that whether the link information registration module sets selectively the link protocol sub-layer module in the data link layer module, and the process proceeds to step S306 if yes, otherwise, it proceeds to step S308.

Step S306, the link protocol sub-layer module notifies the mounted specific communication protocols to process the application message, and the process proceeds to step S307.

Step S307, the specific communication protocols process the application message internally and send protocol frames of the application message to a segmentation and recombination sub-layer module, and the process proceeds to step S309.

Step S308, the application message is sent directly to a segmentation and recombination sub-layer module, and the process proceeds to step S309.

Step S309, it is determined whether the link information registration module sets selectively the segmentation and recombination sub-layer module in the data link layer module, and the process proceeds to step S310 if yes, otherwise, it proceeds to step S311.

Step S310, the segmentation and recombination sub-layer module recombines the application message, and the process proceeds to step S311.

Step S311, the application message is transmitted to a message distribution layer module.

Figure 4:
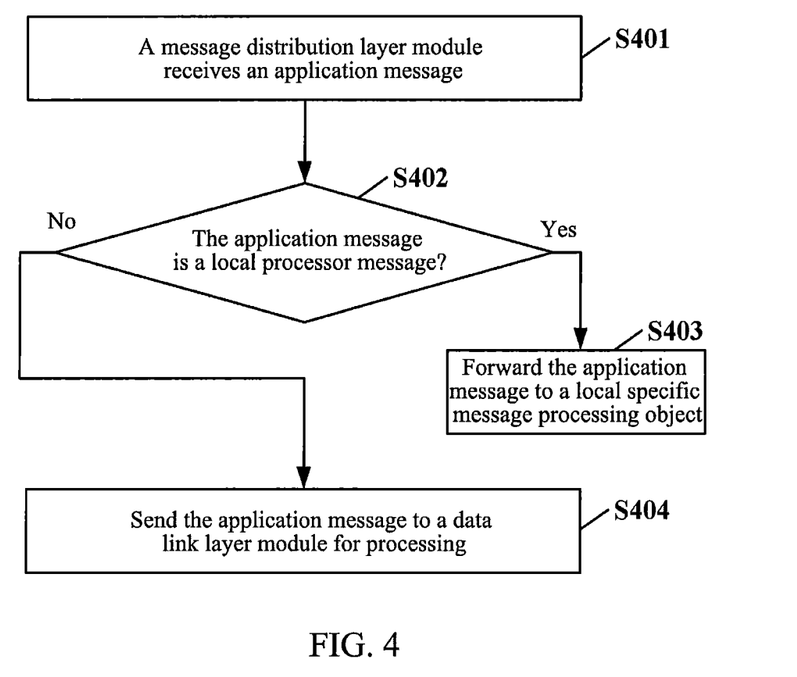
FIG. 4 is a flow chart of a process for a message distribution layer module to process an application message in accordance with the present invention.

Referring to FIG. 4, a flow chart of a process for a message distribution layer module to processing an application message in accordance with the present invention is shown. The process comprises the following steps.

Step S401, the message distribution layer module receives the application message, and the process proceeds to step S402.

The application message received by the message distribution layer module may be an application message sent by an upper application (when the message is sent), or an application message sent by a data link layer module or a physical layer module (when the message is received).

Step S402, the application message is routed, and it is determined whether the application message is a message of a local processor, and the process proceeds to step S403 if yes, otherwise, it proceeds to step S404.

Step S403, a message forwarding interface forwards the application message to a local specific message processing object.

Step S404, the application message is sent to a data link layer module for processing.

Of course, the application message may be transferred directly to a physical layer in step S404.

Figure 5:
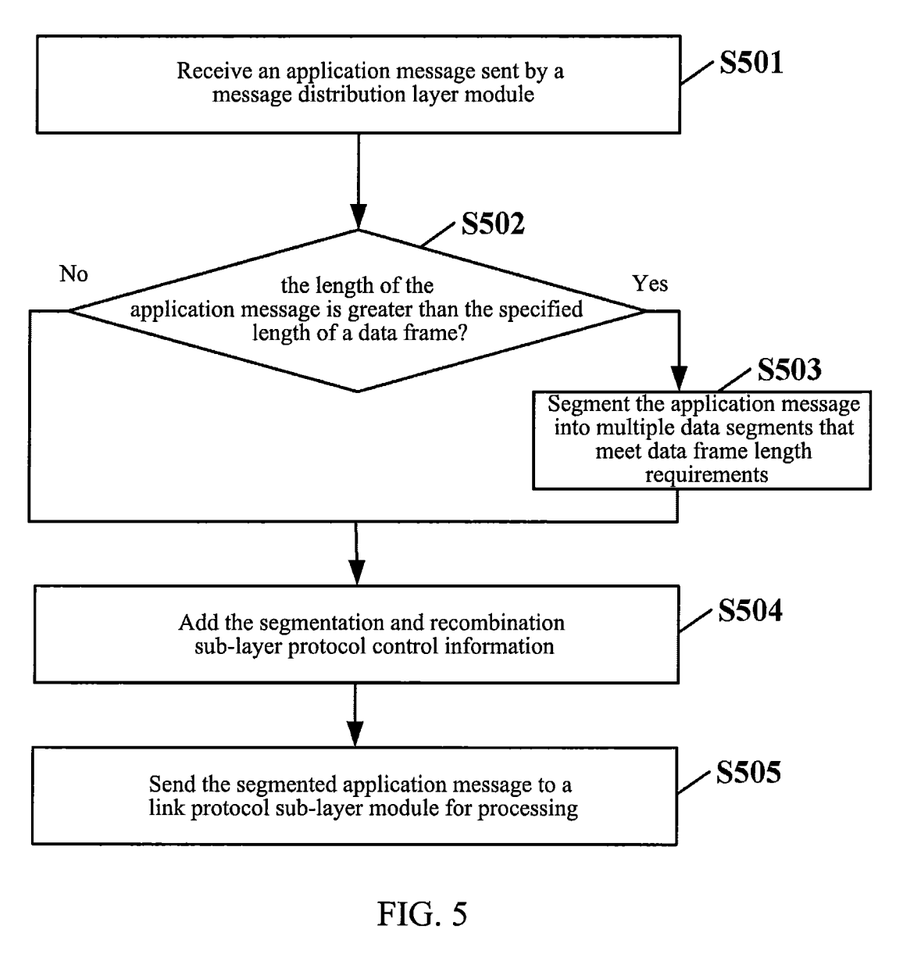
FIG. 5 is a flow chart of a process for a segmentation and recombination sub-layer module to process an application message when sending the message in accordance with the present invention.

Referring to FIG. 5, a flow chart of a process for a segmentation and recombination sub-layer module to process an application message when the message is sent in accordance with the present invention is shown. The process comprises the following steps.

Step S501, the application message sent by a message distribution layer module is received, and the process proceeds to step S502.

Step S502, it is determined whether the length of the application message is greater than the specified length of a data frame, and the process proceeds to step S503 if yes, otherwise, it proceeds to step S504.

Step S503, the application message is segmented into multiple data segments that meet data frame length requirements, and the process proceeds to step S504.

The purpose of step S503 is to segment the application message into link protocol data frames that are suitable to be transmitted by specific communication protocols.

Step S504, segmentation and recombination sub-layer protocol control information is added, and the process proceeds to step S505.

Step S505, the segmented application message is transmitted to a link protocol sub-layer module for processing.

Figure 6:
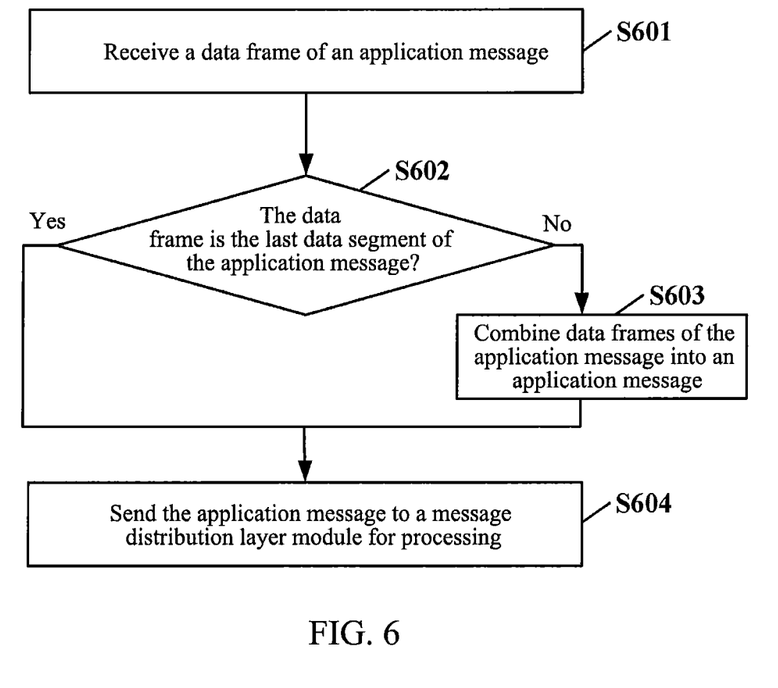
FIG. 6 is a flow chart of a process for a segmentation and recombination sub-layer module to process an application message when receiving the message in accordance with the present invention.

Referring to FIG. 6, a flow chart of a process for a segmentation and recombination sub-layer module to process an application message when the message is received in accordance with the present invention is shown. The process comprises the following steps.

Step S601, a data frame of the application message sent by a link protocol sub-layer module is received, and the process proceeds to step S602.

Step S602, it is determined whether the data frame is the last data segment of the application message, and the process proceeds to step S604 if yes, otherwise, it proceeds to step S603.

Step S603, data frames of the application message are combined into an application message based on the protocol control information, and the process proceeds to step S604.

Step S604, the application message is transmitted to a message distribution layer module for processing.

Figure 7:
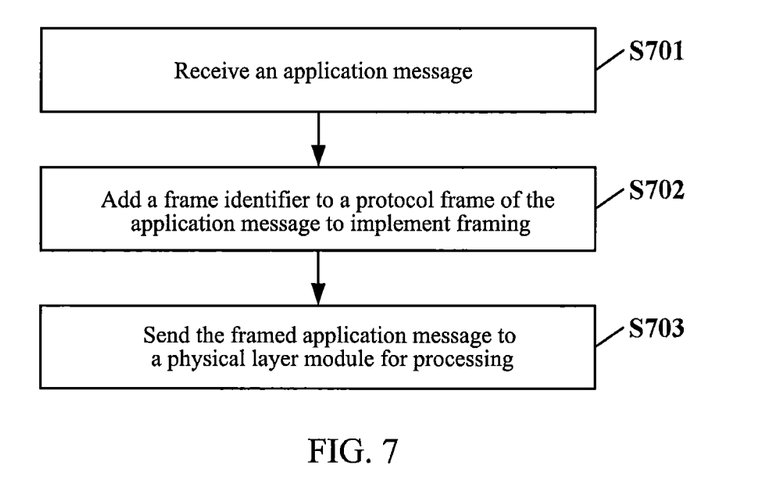
FIG. 7 is a flow chart of a process for a frame delimitation sub-layer module to frame an application message when sending the message in accordance with the present invention.

Referring to FIG. 7, a flow chart of a process for a frame delimitation sub-layer module to process an application message when the message is sent in accordance with the present invention is shown. The process comprises the following steps.

Step S701, the application message is received, and the process proceeds to step S702.

The application message may be protocol frames of an application message sent by the link protocol sub-layer module, or an application message sent by a segmentation and recombination sub-layer module or a message distribution layer module.

Step S702, a frame identifier is added to a protocol frame of the application message to implement framing.

A frame header flag is added at the beginning of the protocol frame of the application message, and a frame end flag is added at the end of the protocol frame.

Escape flags are inserted in the protocol frame and prior to symbols, such as a frame header flag and a frame end flag.

Step S703, the framed application message is sent to a physical layer for processing.

Figure 8:
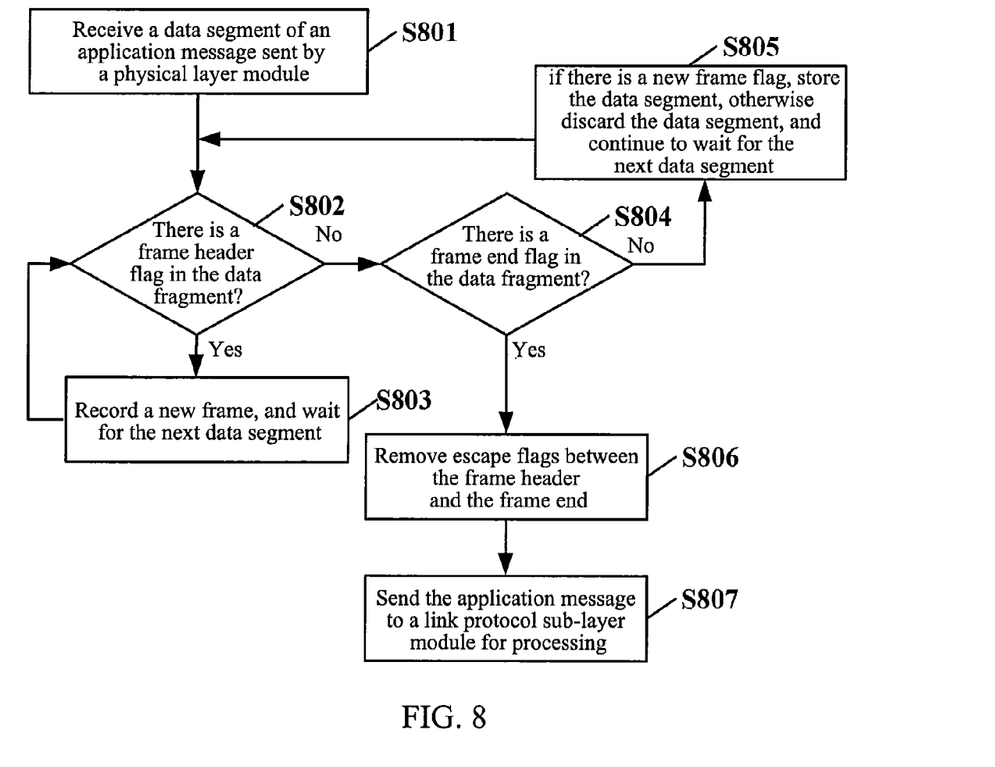
FIG. 8 is a flow chart of a process for a frame delimitation sub-layer module to de-frame an application message when receiving the message in accordance with the present invention.

Referring to FIG. 8, a flow chart of a process for a frame delimitation sub-layer module to de-frame an application message when the message is received in accordance with the present invention is shown. The process comprises the following steps.

Step S801, a data segment of the application message sent by a physical layer are received.

Step S802, it is determined whether there is a frame header flag in the data fragment, and the process proceeds to step S803 if yes, otherwise, it proceeds to step S804.

Step S803, a new frame is recorded, and the next data segment is waited, and the process proceeds to step S802.

Step S804, it is determined whether there is a frame end flag in the data fragment, and the process proceeds to step S806 if yes, otherwise, it proceeds to step S805.

Step S805, if there is a new frame flag, the data segment is stored, otherwise, the data segment is discarded to continue to wait for the next data segment, and the process proceeds to step S802.

Step S806, all of the escape flags between the frame header and the frame end are removed, and the application message is restored, and the process proceeds to step S807.

Step S807, the application message is transferred to a link protocol sub-layer module for processing.

Of course, the application message may be transferred directly to a segmentation and recombination sub-layer module or a message distribution layer module for processing in step S807.

In order to implement the transmission of the application message between the message distribution layer module and the data link layer module as well as between the data link layer module and the physical layer module, mappings between an application message address and a link address as well as between the link address and a physical layer address are required to be implemented.

Based on characteristics of objects on which the transmitting and receiving of application message by a processor upper application depend, an address uniquely identifying an application message is set. For example, based on process communication, i.e., taking transmitting and receiving objects of the message as a process, a unique process identifier (PID) containing processor location information in which the process is located is set as an application message address.

In order to implement the mapping between the application message address and the link address, between which there is a one to one relationship, if processor locations contained in the PID are numbered from 1 to 10, the link addresses (the link numbers) may also be numbered correspondingly from 1 to 10, that is, there is a one-to-one mapping function relationship between the processor locations and the link addresses, so as to provide a switching interface between the message distribution layer module and the data link layer module and to implement transmission of the application message between the two modules.

There is a one-to-one mapping function relationship between the link addresses (link numbers) and the physical addresses as well. In the case of Ethernet communication, the physical addresses are MAC addresses. If the physical addresses are MAC addresses from aa:bb:cc:dd:ee:01 to aa:bb:cc:dd:ee:06, the corresponding link numbers are from 1 to 6, so as to provide a switching interface between the data link layer and the physical layer module to implement transmission of the application message between the two modules.

Figure 9:
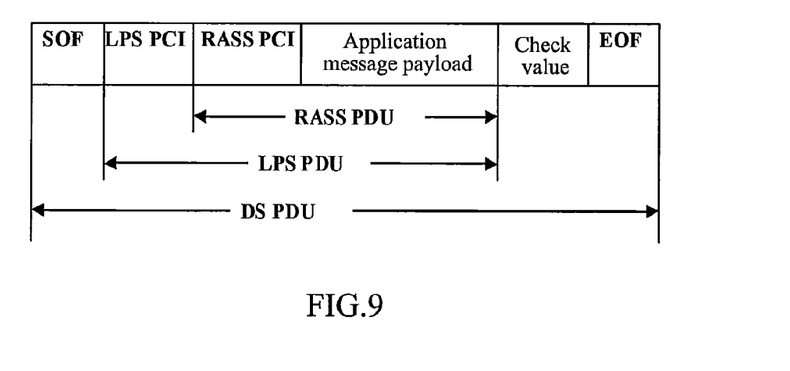
FIG. 9 is a structural diagram of data frames of an application message in accordance with the present invention.

Referring to FIG. 9, a structural diagram of a data frame acquired by processing an application message (application message payload) through each sub-layer module in the data link layer module in accordance with the present invention is shown. RASS PCI denotes protocol control information of a segmentation and recombination sub-layer, RASS PDU denotes a protocol data unit of the segmentation and recombination sub-layer, LPS PCI denotes protocol control information of a link protocol sub-layer, LPS PDU denotes a protocol data unit of a link protocol sub-layer, SOF denotes a frame header flag used by a frame delimitation sub-layer to implement framing, EOF denotes a frame end flag used by the frame delimitation sub-layer to implement framing, and DS PDU denotes a protocol data unit of the frame delimitation sub-layer.

It may be understood by those skilled in the art that some or all of the steps in the abovementioned method can be completed by instructing relevant hardware components with programs, which are stored in a computer readable storage medium, such as Read Only Memory (ROM), magnetic disk, optical disk, or Random Access Memory (RAM). In each method embodiment of the present invention, the serial number of each step is not intended to restrict the order of the steps. It is understood by those skilled in the art that the order of the steps may be changed within the scope of the present invention without any creative work.

The above description is the preferred embodiments of the present invention only, and is not intended to limit the present invention. Any modification, equivalent substitution and improvement made within the spirit and principle of the present invention should be covered in the protection scope of the present invention.

INDUSTRIAL APPLICABILITY

The present invention uses a hierarchical design to seamlessly mount a variety of specific communication protocols into a communication hierarchical structure (an interface of a link protocol sub-layer module) by summarizing characteristics of the existing communication protocols so as to resolve the opacity of a message processing object to bottom link and the dependence of the message processing object on the specific protocols, thereby increasing the flexibility of protocol transposition and greatly reducing workload of the protocol transposition, thus it is very suitable for distributed system environments in which multiple message transmission protocols coexist.

What is claimed is:

1. An inter-board communication apparatus, comprising a processor and a storage device, wherein the storage device stores processor-executable programs, and the programs comprise the following modules:

a message distribution layer module configured to determine whether an application message is processed locally or sent out, and when the application message is determined to be sent out, route the application message to a data link layer module or a physical layer module according to link attribution information of the application message;

the data link layer module connected to the message distribution layer module and configured to perform link transmission of a received application message, wherein the data link layer module comprises a link protocol sub-layer module which can be selectively configured to:

provide an interface connecting the link protocol sub-layer module with threads of external communication protocols, such that different threads of external communication protocols can be interfaced to the link protocol sub-layer module, and when the link protocol sub-layer module is configured, submit the received application message to a thread of a specific communication protocol corresponding to the received application message for processing;

the physical layer module connected to the data link layer module and configured to physically transmit the received application message; and a link information registration module configured to register link attribute information of application messages, and determine whether to configure the link layer protocol sub-layer module in the data link layer module based on registered link attribute information of an application message, and when it is yes, determine a thread of a specific communication protocol corresponding to the application message to be interfaced to the link protocol sub-layer module;

so as to support control of the inter-board communication.

2. The inter-board communication apparatus according to claim 1, wherein the data link layer modules further comprises a segmentation and recombination sub-layer module which can be configured to:

segment a received application message into data frames with fixed length to send to the link protocol sub-layer module when the inter-board communication apparatus is used to send an application message, or recombine a received data frames with fixed length processed by a thread of a specific communication protocols into an application message when the inter-board communication apparatus is used to receive an application message;

the link protocol sub-layer module is further configured to receive the segmented data frames with fixed length when the inter-board communication apparatus is used to send an application message;

the link information registration module is further configured to determine whether to configure the segmentation and recombination sub-layer module in the data link layer module based on both of the link attribute information and the specific communication protocol of an application message.

3. The inter-board communication apparatus according to claim 1, wherein the data link layer module further comprises a frame delimitation sub-layer module which can be selectively configured to:

add a frame identifier to a received application message processed by a thread of a specific communication protocols to implement framing and send the framed application message to the physical layer module when the inter-board communication apparatus is used to send an application message, or acquire a complete application message based on the frame identifier to implement de-framing and send the de-framed application message to the link protocol sub-layer module when the inter-board communication apparatus is used to receive an application message;

the link information registration module is further configured to determine whether to configure the frame delimitation sub-layer module in the data link layer module based on both of the link attribute information, and the specific communication protocol of an application message.

4. The inter-board communication apparatus according to claim 1, wherein the message distribution layer module determines whether the application message is processed locally or sent out based on a mapping relationship between a link address and an application message address of the received application message.

5. A method for transmitting a message of an inter-board communication apparatus, comprising:

step A: a link information registration module registering link attribute information of application messages;

step B: the link information registration module determining whether to configure a link protocol sub-layer module in a data link layer module based on registered link attribute information of an application message, and when it is yes, further determining a thread of a specific communication protocol corresponding to the application message to be interfaced to the link protocol sub-layer module;

step C: a message distribution layer module routing an application message sent by an upper application, and determining whether the application message is processed locally or sent out; and when the application message is determined to be sent out, routing the application message to the data link module or a physical layer module according to link attribute information of the application message;

step D: the link protocol sub-layer module receiving and submitting a received application message to a thread of a specific communication protocol corresponding to the received application message which is interfaced to the link protocol sub-layer module for processing, the processed application message being sent to a physical layer module, when the application message is determined not to be transmitted via the data link layer module, the application message is sent directly to the physical layer module by the message distribution layer module without through the data link layer module; and step E: the physical layer module physically transmitting the received application message.

6. The method according to claim 5, wherein the step B further comprises: the link information registration module determining whether to configure a segmentation and recombination sub-layer module in the data link layer module based on both of the link attribute information, and the specific communication protocol of the application message;

when the segmentation and recombination sub-layer module is configured in the data link layer module, before the link protocol sub-layer module receives the application message, the step D further comprises:

the segmentation and recombination sub-layer module segmenting the application message sent by the message distribution layer module into data frames with fixed length to send to the link protocol sub-layer module.

7. The method according to claim 5, wherein
the step B further comprises: the link information registration module determining whether to configure a frame delimitation sub-layer module in the data link layer module based on both of the link attribute information, and the specific communication protocol of the application message;
when the frame delimitation sub-layer module is configured in the data link layer module, after the application message is processed by the thread of the specific communication protocols, the step D further comprises:
the frame delimitation sub-layer module receiving the application message processed by the thread of the specific communication protocols, and adding a frame identifier to the application message to implement framing and send the framed application message to the physical layer module.

8. A method for receiving a message of an inter-board communication apparatus, comprising:
step A: a link information registration module registering link attribute information of application messages;
step B: the link information registration module determining whether to configure a link protocol sub-layer module in a data link layer module based on a registered link attribute information of an application message, and when it is yes, determining a thread of a specific communication protocol corresponding to the application message to be interfaced to the link protocol sub-layer module;
step C: a physical layer module receiving an application message physically transmitted and determining whether the received application message to be transmitted via the data link layer module;
step D: the link protocol sub-layer module receiving and submitting a transmitted application message to a thread of a specific communication protocol corresponding to the transmitted application message which is interfaced to the link protocol sub-layer module for processing, and sending the processed application message to a message distribution layer module,
when the received application message is determined not to be transmitted via the data link layer module, the received application message is directly sent to the message distribution layer module by the physical layer module without through the data link layer module; and
step E: the message distribution layer module routing the received application message to determine whether the application message is processed locally or sent out.

9. The method according to claim 8, wherein the step B further comprises: the link information registration module determining whether to configure a frame delimitation sub-layer module in the data link layer module based on both of the registered link attribute information, and the specific communication protocol of the application message;
when the frame delimitation sub-layer module is configured in the data link layer module, before the link protocol sub-layer module receives the transmitted application message, the step D further comprises:
the frame delimitation sub-layer module acquiring a complete application message based on a frame identifier of the transmitted application message to implement de-framing and send the de-framed application message to the link protocol sub-layer module.

10. The method according to claim 8, wherein the step B further comprises: the link information registration module determining whether to configure a segmentation and recombination sub-layer module in the data link layer module based on both of the registered link attribute information, and the specific communication protocol of the application message;
when the segmentation and recombination sub-layer module is configured in the data link layer module, after the application message is processed by the thread of the specific communication protocol corresponding to the application message, the step D further comprises:
the segmentation and recombination sub-layer module receiving data frames with fixed length processed by the thread of the specific communication protocols to recombine into an application message and send the recombined application message to the message distribution layer module.

11. The inter-board communication apparatus according to claim 2, wherein the message distribution layer module determines whether the application message is processed locally or sent out based on a mapping relationship between a link address and an application message address of the received application message.

12. The inter-board communication apparatus according to claim 3, wherein the message distribution layer module determines whether the application message is processed locally or sent out based on a mapping relationship between a link address and an application message address of the received application message.

13. The inter-board communication apparatus according to claim 1, wherein the attribute of the real link through which the received application message to be transmitted or received comprises unique process identifier (PID) containing processor location information.

* * * * *